(12) United States Patent
Bahr et al.

(10) Patent No.: US 9,872,200 B2
(45) Date of Patent: *Jan. 16, 2018

(54) CONGESTION NOTIFICATION ELEMENT AND METHOD FOR CONGESTION CONTROL

(71) Applicant: Siemens Aktiengesellschaft, Munich (DE)

(72) Inventors: Michael Bahr, Munich (DE); Barbara Staehle, Fuerstenfeldbruck (DE); Dirk Staehle, Fuerstenfeldbruck (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 48 days.

This patent is subject to a terminal disclaimer.

(21) Appl. No.: 14/856,785

(22) Filed: Sep. 17, 2015

(65) Prior Publication Data

US 2016/0014636 A1    Jan. 14, 2016

Related U.S. Application Data

(63) Continuation of application No. 13/991,479, filed as application No. PCT/EP2011/071950 on Dec. 6, 2011.

(30) Foreign Application Priority Data

Dec. 7, 2010 (EP) .................................... 10194018

(51) Int. Cl.
*H04W 4/00* (2009.01)
*H04W 28/02* (2009.01)
(Continued)

(52) U.S. Cl.
CPC ......... *H04W 28/0289* (2013.01); *H04L 47/11* (2013.01); *H04L 47/12* (2013.01); *H04L 47/14* (2013.01); *H04L 47/26* (2013.01)

(58) Field of Classification Search
CPC .......... H04W 28/0284; H04W 28/0289; H04L 47/10; H04L 47/11; H04L 47/115;
(Continued)

(56) References Cited

U.S. PATENT DOCUMENTS 6,356,962 B1 * 3/2002 Kasper .................. G06F 13/128
                                                      370/229
6,563,831 B1 * 5/2003 Dally ...................... H04L 45/00
                                                      370/389

(Continued)

FOREIGN PATENT DOCUMENTS

| EP | 1936880 A1 | 6/2008 | ............. H04L 12/56 |
| JP | 2003174452 A | 6/2003 | ............. H04B 7/24 |
| WO | 2012/076540 A1 | 6/2012 | ............. H04L 12/56 |

OTHER PUBLICATIONS

Xu, Kaixin et al., "TCP Unfairness in Ad Hoc Wireless Networks and a Neighborhood RED Solution," Wireless Networks 11, 17 pages, 2005.

(Continued)

*Primary Examiner* — Kevin Mew
(74) *Attorney, Agent, or Firm* — Slayden Grubert Beard PLLC

(57) ABSTRACT

A congestion notification element for indicating a congestion status of a mesh node may include at least one field specifying a mesh destination for which an intra-mesh congestion control is to be applied. This may allow for forwarding data frames on paths that share some links but not the bottleneck link with a path that is congestion (Continued)

controlled, which has not been possible with currently specified congestion notification techniques.

26 Claims, 3 Drawing Sheets

(51) Int. Cl.
*H04L 12/801* (2013.01)
*H04L 12/825* (2013.01)
(58) Field of Classification Search
CPC ....... H04L 47/12; H04L 47/122; H04L 47/14; H04L 47/26
See application file for complete search history.

(56) References Cited

U.S. PATENT DOCUMENTS

| | | | | |
|---|---|---|---|---|
| 6,826,620 | B1 | 11/2004 | Mawhinney et al. | 709/235 |
| 6,865,185 | B1 | 3/2005 | Patel et al. | 370/412 |
| 7,016,971 | B1* | 3/2006 | Recio | H04L 47/10 709/233 |
| 7,151,773 | B1 | 12/2006 | Mo et al. | 370/392 |
| 7,408,929 | B2 | 8/2008 | Adachi et al. | 370/389 |
| 8,111,649 | B1 | 2/2012 | Agarwall et al. | 370/328 |
| 8,189,479 | B1* | 5/2012 | Doherty | H04L 47/27 370/232 |
| 2002/0136163 | A1* | 9/2002 | Kawakami | H04L 47/26 370/229 |
| 2003/0063607 | A1 | 4/2003 | Adachi et al. | 370/389 |
| 2004/0008628 | A1 | 1/2004 | Banerjee | 370/236.1 |
| 2004/0081090 | A1* | 4/2004 | Hara | H04L 12/5693 370/229 |
| 2006/0092840 | A1* | 5/2006 | Kwan | H04L 47/10 370/230.1 |
| 2007/0127378 | A1* | 6/2007 | Yang | H04L 47/10 370/235 |
| 2007/0183332 | A1* | 8/2007 | Oh | H04L 47/10 370/236 |
| 2007/0268830 | A1* | 11/2007 | Li | H04L 49/351 370/235 |
| 2008/0198746 | A1 | 8/2008 | Kwan et al. | 370/231 |
| 2008/0259798 | A1* | 10/2008 | Loh | H04L 45/302 370/235 |
| 2009/0052326 | A1* | 2/2009 | Bergamasco | H04L 47/10 370/236 |
| 2009/0196194 | A1* | 8/2009 | Paloheimo | H04L 45/26 370/252 |
| 2009/0232001 | A1 | 9/2009 | Gong et al. | 370/236 |
| 2009/0268612 | A1* | 10/2009 | Felderman | H04L 47/10 370/230 |
| 2009/0268614 | A1* | 10/2009 | Tay | H04L 47/10 370/236 |
| 2010/0027424 | A1* | 2/2010 | Radunovic | H04W 40/04 370/238 |
| 2010/0034091 | A1* | 2/2010 | Hiertz | H04L 47/10 370/236 |
| 2010/0195495 | A1* | 8/2010 | Yeung | H04L 47/10 370/231 |
| 2010/0322072 | A1* | 12/2010 | Fujihira | H04L 45/50 370/230 |
| 2012/0182860 | A1* | 7/2012 | Liu | H04L 12/1863 370/216 |
| 2012/0236726 | A1* | 9/2012 | Shihada | H04L 43/0852 370/237 |
| 2013/0010798 | A1* | 1/2013 | Shaffer | H04L 47/245 370/395.42 |
| 2013/0088969 | A1 | 4/2013 | Mukheijee et al. | 370/236 |
| 2013/0208671 | A1* | 8/2013 | Royz | H04L 25/00 370/329 |
| 2013/0279341 | A1 | 10/2013 | Bahr et al. | 370/237 |

OTHER PUBLICATIONS

Lochert, Christian et al., "A Survey on Congestion Control for Mobile Ad-Hoc Networks," Wiley Wireless Communications and Mobile Computing 7 (5), 27 pages, Jun. 2007.

Akyol, Umut et al., "Joint Scheduling and Congestion Control in Mobile Ad-Hoc Networks," IEEE INFOCOM, 9 pages, 2008.

IEEE P802.11sTM/D3.0, Draft Standard for Information Technology—Telecommunications and Information Exchange between Systems—Local and Metropolitan Area Networks—Specific Requirements—, Part 11: Wireless LAN Medium Access Control (MAC) and Physical Layer (PHY) Specifications, Amendment 10: Mesh Networking, 240 pages, Mar. 2009.

Fu, Desheng et al., "On the Potential of IEEE 802.11s Intra-Mesh Congestion Control," 13th ACM International Conference on Modeling, Analysis, and Simulation of Wireless and Mobile Systems, 8 pages, Oct. 2010.

IEEE P802.11sTM/D7.03, Draft Standard for Information Technology—Telecommunications and Information Exchange between Systems—Local and Metropolitan Area Networks—Specific Requirements—, Part 11: Wireless LAN Medium Access Control (MAC) and Physical Layer (PHY) Specifications, Amendment 1: Mesh Networking, 342 pages, Nov. 2010.

International Search Report and Written Opinion, Application No. PCT/EP2011/071950, 14 pages, dated Mar. 16, 2012.

European Office Action, Application No. 11802676.4, 9 pages, dated Jul. 21, 2014.

Japanese Office Action, Application No. 2013542511, 3 pages, dated Jul. 22, 2014.

Chinese Office Action, Application No. 201180066978.2, 20 pages, dated Apr. 16, 2015.

Chinese Office Action, Application No. 201180066978.2, 7 pages, dated Jul. 29, 2016.

U.S. Final Office Action, U.S. Appl. No. 13/991,479, 45 pages, dated Feb. 3, 2017.

U.S. Non-Final Office Action, U.S. Appl. No. 13/991,479, 9 pages, dated Sep. 21, 2017.

* cited by examiner

FIG 6

| 600 | 602 | 604 | 606 | 608 | 610 | 612 |
|---|---|---|---|---|---|---|
| Element ID | 14 | mesh STA F | <t0> µs | <t1> µs | <t2> µs | <t3> µs |

FIG 7

| 700 | 702 | 704 | 706 | 708 | 710 | 712 |
|---|---|---|---|---|---|---|
| Element ID | 14 | mesh STA G | <t4> µs | <t5> µs | <t6> µs | <t7> µs |

CONGESTION NOTIFICATION ELEMENT AND METHOD FOR CONGESTION CONTROL

CROSS-REFERENCE TO RELATED APPLICATIONS

This application is a Continuation of U.S. patent application Ser. No. 13/991,479 filed Jul. 10, 2013, which is a U.S. National Stage Application of International Application No. PCT/EP2011/071950 filed Dec. 6, 2011, which designates the United States of America, and claims priority to EP Patent Application No. 10194018.7 filed Dec. 7, 2010. The contents of which are hereby incorporated by reference in their entirety.

TECHNICAL FIELD

This disclosure relates to a method for congestion control for the avoidance of traffic congestion within a network, particularly a wireless mesh network. The invention further relates to a congestion notification element granting an enhanced congestion control.

BACKGROUND

A number of congestion control methods are known in the art. An exemplary congestion control method including a congestion notification element is disclosed in IEEE P802.11s, Draft Standard >>Wireless LAN Medium Access Control (MAC) and Physical Layer (PHY) specifications—Mesh Networking<<, version D7.03, November 2010, hereinafter referred to as >>draft standard<<. The structure of said congestion notification element is particularly described in section 7.3.2.99 of the draft standard.

In accordance with the aforementioned congestion control method, a mesh node that detects congestion may transmit a congestion notification element to the mesh nodes of its traffic source or other adjacent mesh nodes.

A major drawback of this known congestion control method is an inherent impreciseness in decreasing the congestion between the source and the mesh node detecting the congestion while affecting traffic between adjacent nodes which previously have not been affected by the congestion.

Reference will now be made to FIG. 1 which demonstrates the drawback mentioned above when applying said known congestion control method.

According to FIG. 1 a plurality of mesh nodes A,B,C,D,E are logically interconnected by links which are depicted by lines interconnecting some of the mesh nodes A,B,C,D,E. A first dataflow DF1 is ranging from a first mesh node A passing a second mesh node B and a third mesh node C to a fourth mesh node D, which is the destination node D of said first dataflow DF1. A second dataflow DF2, illustrated by a dotted line, is ranging from the first mesh node A passing the second mesh node B to a fifth mesh node E, which is the destination node E of said second dataflow DF2.

A link between the third mesh node C and the fourth mesh node D is affected by a reduced transfer rate because of a bottleneck BN of any kind between the third mesh node C and the fourth mesh node D. This bottleneck BN causes congestion at the third mesh node C. In order to decrease this congestion, the third mesh node C sends a—not shown—congestion notification to the source of its link, which is the adjacent second mesh node B.

Subsequently, the second mesh node B stops or decreases, or, in other words, postpones, sending data frames to the third mesh node C. These are data frames of the first data flow DF1. However, data frames are still sent by the second mesh node B to a fifth mesh node E along the second dataflow DF2 since the link between the second mesh node B and the fifth mesh node E is not affected by the bottleneck BN between the third mesh node C and the fourth mesh node D.

Inevitably, the second mesh node B is affected by congestion since the second mesh node B does not forward data frames to the third mesh node C any more but still receives data frames from an adjacent first mesh node A. Subsequently, the second mesh node B sends a congestion notification to the first mesh node A. Having received this notification, the first mesh node A will stop sending data frames to the second mesh node B. These are data frames of both the first data flow DF1 and the second data flow DF2.

The described scenario eventually leads to a situation, where the second data flow DF2 between the first mesh node A and the fifth mesh node E is stopped although the initial bottleneck between the third mesh node C and the fourth mesh node D has no negative impact on the second data flow DF2.

SUMMARY

One embodiment provides a congestion notification element for indicating a congestion status of a mesh node in a mesh network, the congestion notification element including at least one field specifying a mesh destination for which an intra-mesh congestion control is to be applied.

In a further embodiment, the mesh destination is determined by an address of a destination mesh node.

In a further embodiment, the mesh destination is determined by a broadcast address.

In a further embodiment, the congestion notification element includes a field specifying a number of fields each field of the number of fields specifying a respective mesh destination.

In a further embodiment, the congestion notification element includes at least one congestion notification, each congestion notification including one of the at least one field specifying the mesh destination, each congestion notification further including at least one field specifying a congestion notification expiration timer, the congestion notification element further including a field specifying a number of congestion notifications included in the congestion notification element.

Another embodiment provides a congestion control notification frame including at least one congestion notification element according to one of the aforementioned claims.

In a further embodiment, the congestion control notification frame includes fields according to known document IEEE P802.11s.

Another embodiment provides a method of controlling congestion in a mesh network, the method including the steps of: receiving at least one congestion control notification frame by a receiving mesh node, the at least one congestion control notification frame being sent by a transmitting mesh node, the at least one congestion control notification frame including at least one congestion notification element; reading at least one transmitter mesh node address of said at least one congestion control notification frame as next hop address; reading at least one destination mesh node address of said at least one congestion notification element, said destination mesh node address being an individual address or a broadcast address; and reading at least one congestion notification expiration timer of said at least one congestion notification element.

In a further embodiment, the method includes the steps of: receiving a data frame by said receiving mesh node, the data frame including a destination address of said data frame; reading the destination address of said data frame; and reading a next hop address for the destination address of said data frame from a forwarding information.

In a further embodiment, the method includes the steps of postponing a forwarding of said data frame by said receiving node for the case that said next hop address for said data frame is equal to at least one next hop address from said at least one congestion control notification frame; and said destination address of said data frame is equal to at least one destination mesh node address from said at least one next hop address of said at least one congestion notification element.

In a further embodiment, the method includes the steps of postponing a forwarding of said data frame by said receiving node for the case that said next hop address for said data frame is equal to at least one next hop address from said at least one congestion control notification frame; and at least one destination mesh node address from said at least one next hop address of said at least one congestion notification element is equal to said broadcast address.

In a further embodiment, said postponing of said forwarding of said data frame is done until a corresponding congestion notification expiration timer of a corresponding access category has expired.

Another embodiment provides a mesh node in a mesh network comprising means for carrying out any of the methods disclosed above.

Another embodiment provides a mesh node in a mesh network comprising means for processing and generating congestion notification elements and/or congestion control notification frames as disclosed above.

Another embodiment provides a mesh network comprising at least one such mesh node.

Another embodiment provides a computer program product, which contains a program code stored on a non-transitory computer-readable medium and which, when executed on a processor of a node in a mesh network, carries out any of the methods disclosed above.

Another embodiment provides a computer program product, which contains a program code stored on a non-transitory computer-readable medium and which, when executed on a processor of a node in a mesh network, processes and/or generates congestion notification elements and/or congestion control notification frames as disclosed above.

BRIEF DESCRIPTION OF THE DRAWINGS

Exemplary embodiments will be explained in more detail below on the basis of the schematic drawings, wherein:

FIG. 6 shows exemplary contents of a congestion notification element according to a first application example; and FIG. 7 shows exemplary contents of a congestion notification element according to a second application example.

DETAILED DESCRIPTION

Some embodiments provide a congestion notification element for indicating an enhanced congestion status by overcoming draw-backs of currently known indications of congestions which are based on a sole next hop indication.

Other embodiments provide an improved congestion control method, which substantially does not affect links to uncongested adjacent nodes.

Accordingly, an improved congestion notification element for indicating a congestion status of a mesh node in a mesh network is provided, the congestion notification element including at least one field specifying a mesh destination for which an intra-mesh congestion control is to be applied.

Accordingly, an improved congestion control method in a sense of a per-destination congestion control in mesh networks is provided, thereby overcoming the draw-backs of currently known congestion control methods based on a sole next hop control.

One possible advantage of the proposed congestion notification element and the proposed method of congestion control lies in the ability of forwarding data frames on paths that share some links but not the bottleneck link with a path that is congestion controlled by specifying a mesh destination for which an intra-mesh congestion control is to be applied. This has not been possible with the currently specified congestion notification of draft standard IEEE 802.11s.

Some embodiments may avoid negative performance impacts on flows which are not passing a congested bottleneck link. The congestion control proposed herein may be directed to data flows passing the bottleneck link.

Reference will now be made in detail to example embodiments of the present invention, examples of which are illustrated in the accompanying drawing, wherein like reference signs refer to like elements throughout.

Figure 2:
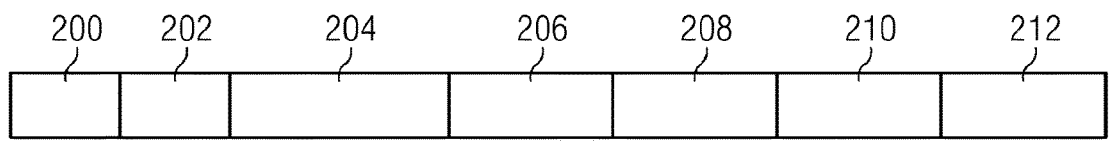
FIG. 2 shows an exemplary structure of a congestion notification element according to an example embodiment.

FIG. 2 shows an exemplary structure of a congestion notification element according to an example embodiment. The congestion notification element includes a first field 200 captioned >>Element ID<< and having a length of one octet. A second field 202 is captioned >>Length<< and has a length of one octet. The first field 200 and the second field 202 form the header of the congestion notification element. The header is followed by a payload portion of the congestion notification element, which fields are described in the following.

The congestion notification element contains four Congestion Notification Expiration Timer fields 206, 208, 210, 212, namely a first Congestion Notification Expiration Timer field 206 captioned >>Congestion Notification Expiration Timer AC_BK<<, a second Congestion Notification Expiration Timer field 208 captioned >>Congestion Notification Expiration Timer AC_BE<<, a third Congestion Notification Expiration Timer field 210 captioned >>Congestion Notification Expiration Timer AC_VI<<, and a fourth Congestion Notification Expiration Timer field 212 captioned >>Congestion Notification Expiration Timer AC_VO<<.

The four Congestion Notification Expiration Timer fields 206, 208, 210, 212, are dedicated to four respective access categories to indicate the estimated congestion duration per access category at the mesh node transmitting the congestion notification.

An access category, also referred to as AC, is applied for implementing a Quality of Service Architecture (QoS). To this end a method called >>Enhanced Distributed Channel Access<<, also referred to as EDCA, is implemented to provide prioritized services using traffic category classification and prioritized media access. An access category is assigned to a respective traffic type as shown below:

Traffic Type: Background
Access Category: AC_BK
Traffic Type: Best-effort
Access Category: AC_BE
Traffic Type: Video
Access Category: AC_VI
Traffic Type: Voice
Access Category: AC_VO The values in the Congestion Notification Expiration Timerfields 206, 208, 210, 212, are encoded as unsigned integers in units of 100 µs.

A third field 204 is captioned >>Destination Mesh STA Address<< and has a length of six octets.

The structure of the Congestion Notification element is partially known so far from the draft standard IEEE 802.11s. According to an example embodiment, this Congestion Notification element is extended by a third field 204, captioned >>Destination Mesh STA Address<< and having a length of six octets. This destination field 204 contains a hardware or MAC address (Media Access Control) of the mesh destination.

FIG. 2 shows a possible format of a congestion control element amended according to an example embodiment. The amended field 204 captioned >>Destination Mesh STA Address<< according to said embodiment is positioned at the first field of the payload portion of the Congestion Notification element. Of course, the amended destination field 204 can alternatively be located after the four Congestion Notification Expiration Timer fields 206, 208, 210, 212 keeping the position of the already existing fields 206, 208, 210, 212.

The amended destination field 204 captioned >>Destination Mesh STA Address<< preferably has a length of six octets. Hence, the length field 202 of the Congestion Notification element is set to 14. The field 200 captioned >>Element ID<< is set to an identifier value defined for this element. The Congestion Notification element is included in—not shown—Congestion Control Notification frames.

The destination field 204 is represented as a 48-bit MAC address and is set to the address of the mesh destination for which the intra-mesh congestion control shall be applied. It is set to the broadcast address if the intra-mesh congestion control shall be applied to all destinations that use the transmitter of the congestion notification element as next hop. This broadcast address is also referred to as group address.

A mesh station receiving an amended Congestion Notification element according to an example embodiment is advantageously capable of stopping the forwarding of data frames with a better selectivity than known before. For a better understanding, a method implying the known Congestion Notification element is compared to a method implying the amended Congestion Notification element according to an example embodiment.

According to a method implying the known Congestion Notification element, a rule for postponing of data frame forwarding is described in pseudo code as follows:

```
IF (MAC address of next hop of data frame == MAC address of
   transmitter of Congestion Notification element)
THEN
     do not forward data frame until the Congestion
     Notification Expiration Timer of the corresponding access
     category has expired.
ENDIF
```

The rule illustrated above will also postpone the forwarding of data frames between mesh nodes which are not affected by a bottleneck. More specifically, with reference to FIG. 1, this rule would also postpone the second dataflow DF2 between the first mesh node A and the fifth mesh node E although the initial bottleneck BN between the third mesh node C and the fourth mesh node D has no negative impact on this second dataflow DF2.

In other words, traffic between the first mesh node A and the fifth mesh node E is postponed because this traffic had to pass the second mesh node B first. However, this kind of traffic is not forwarded, because the second mesh node B has sent a Congestion Notification element to the first mesh node A.

According to a method implying the amended Congestion Notification element according to an example embodiment, an amended rule for postponing of data frame forwarding is described in pseudo code as follows:

```
IF (MAC address of next hop of data frame == MAC address of
   transmitter of Congestion Notification element)
THEN
     IF (MAC address of mesh destination of data frame ==
     Destination Mesh STA Address in Congestion Notification
     element)
     THEN
          do not forward data frame until the corresponding
          Congestion Notification Expiration Timer of the
          corresponding access category has expired.
     ENDIF
ENDIF
```

The amended rule for postponing of data frame forwarding described in pseudo code above is generally described as follows:

The forwarding of a data frame at a receiving node is postponed for the case that:

the address of the next hop of the data frame is equal to the transmitter address of at least one received congestion control notification frame;

AND;

the destination address of the data frame is equal to at least one destination mesh node address of at least one congestion notification element that has been received from the next hop of the data frame;

AND;

the corresponding Congestion Notification Expiration Timer for said next hop, destination address, and access category of the data frame has not expired.

An >>AND<< in the condition above is to be understood as logical AND.

In case that the destination field 204 of the at least one received congestion notification element is set to the broadcast address in order to apply the intra-mesh congestion control to all destinations that use the transmitter of the congestion notification element as next hop, the amended rule for postponing of data frame forwarding is generally described as follows:

The forwarding of a data frame at a receiving node is postponed for the case that:

the address of the next hop of the data frame is equal to the transmitter address of at least one received congestion control notification frame;

AND;

the destination mesh node address of at least one congestion notification element, that has been received from the next hop of the data frame, is equal to the broadcast address;

AND;

the corresponding Congestion Notification Expiration Timer for said next hop, destination address, and access category of the data frame has not expired.

The amended rule for forwarding of a data frame is generally described as follows:

A data frame is forwarded by a receiving node for the case that none of the two amended rules above for postponing the forwarding apply to the data frame.

The amended rule for forwarding the data frame is generally described as follows:

A data frame is forwarded by a receiving node for the case that:

the next hop address of the data frame is not equal to at least one next hop address from at least one received congestion control notification frame;

OR;

(the destination address of the data frame is not equal to at least one destination mesh node address from at least one congestion notification element that has been received from the next hop of the data frame; AND; each destination mesh node address from all congestion notification elements that have been received from the next hop of the data frame are different from the broadcast address);

OR;

all corresponding Congestion Notification Expiration Timers for said next hop, destination address, and access category of the data frame have expired.

These amended rules will not postpone the forwarding of data frames between mesh nodes which are not affected by a bottleneck, because the mesh destination is not to be congestion controlled. More specifically, according to FIG. 1, this rule will not postpone traffic between the first mesh node A and the fifth mesh node E because the mesh destination, which is the fifth mesh node E, is not to be congestion controlled. The mesh destination address of the data frames is different from the address of the mesh destination signaled in the Congestion Notification element, i.e. the second, inner IF-condition is not fulfilled.

Figure 1:
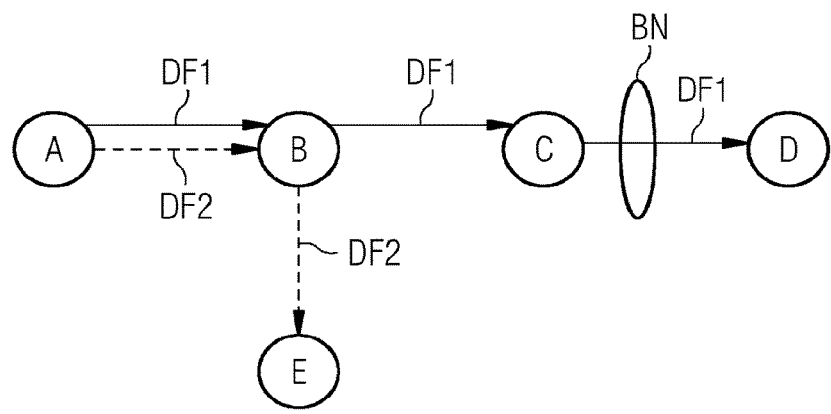
FIG. 1 shows an exemplary section of a network structure for illustrating a first congestion situation.
Figure 3:
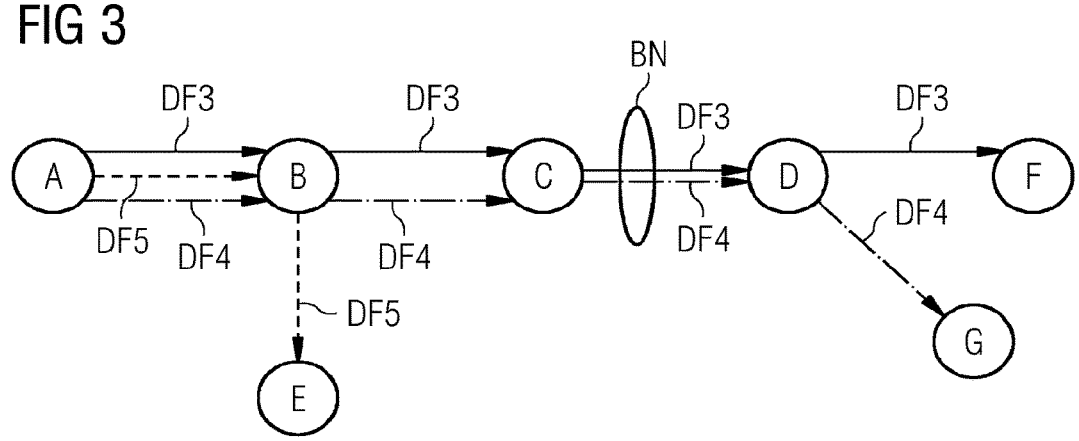
FIG. 3 shows an exemplary section of a network structure for illustrating a second congestion situation.

In the topology of FIG. 1, there is only a single dataflow DF1 initially affected by the bottleneck BN. FIG. 3 shows a topology where more than one data flow is affected by a bottleneck BN. Further on, affected data flows in FIG. 3 have different destinations.

According to FIG. 3, a plurality of mesh nodes A,B,C,D, E,F,G are logically interconnected by links which are depicted by lines interconnecting some of the mesh nodes A,B,C,D,E,F,G. A third dataflow DF3 is ranging from the first mesh node A passing the second mesh node B, the third mesh node C, the fourth mesh node D to a sixth mesh node F, which is the destination node F of said third dataflow DF3. A fourth dataflow DF4, illustrated by a dashed-and-dotted line, is ranging from the first mesh node A passing the second mesh node B, the third mesh node C, the fourth mesh node D to a seventh mesh node G, which is the destination node G of said fourth dataflow DF4. A fifth dataflow DF5, illustrated by a dotted line, is ranging from the first mesh node A passing the second mesh node B to the fifth mesh node E, which is the destination node E of said fifth dataflow DF5.

In a situation shown in FIG. 3, whereby the link between the third mesh node C and the fourth mesh node D becomes congested by a bottleneck BN, both, the third and the fourth dataflow DF3, DF4 contribute to the congestion at the bottleneck BN.

Hence, the third mesh node C has to send two Congestion Notification elements, one for each affected destination, when using the format of the Congestion Notification element as shown in FIG. 2.

According to an example embodiment it is proposed to include these two, or in general, at least one, Congestion Notification elements in a single Congestion Control Notification frame, the type of management frame of IEEE 802.11 that is used to transmit Congestion Notification elements, see Draft Standard IEEE P802.11s entitled: >>Wireless LAN Medium Access Control (MAC) and Physical Layer (PHY) specifications—Mesh Networking<<, Version D7.03, November 2010, clause 7.4.15.6, entitled >>Congestion Control Notification frame format<<.

Alternatively, one could send two or more Congestion Control Notification frames with only one Congestion Notification element, but this will introduce an additional delay between the receptions of the different Congestion Notification elements due to the contention for the media access between the Congestion Control Notification frames.

Figure 4:
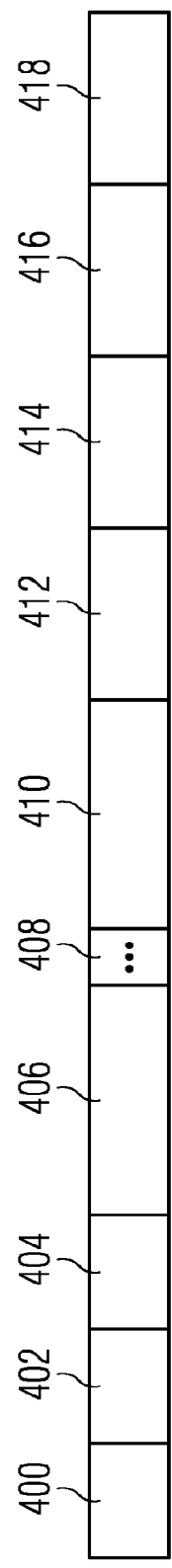
FIG. 4 shows an exemplary structure of a congestion notification element with multiple destination addresses according to an example embodiment.

FIG. 4 shows an exemplary structure of a congestion notification element with multiple destination addresses according to an alternative embodiment. The congestion notification element according to this embodiment uses a list of destinations in a single Congestion Notification element.

In analogy to the congestion notification element known from FIG. 2, the congestion notification element according to FIG. 4 includes a first field 400 captioned >>Element ID<< and having a length of one octet and a second field 402 captioned >>Length<< and having a length of one octet.

A third field 404 captioned >>Number of Destinations N<< defines a number (N) of fields captioned >>Destination Mesh STA Address<< included within the Congestion Notification element. The third field 404 has a length of one octet.

Said fields 406, 408, 410 captioned >>Destination Mesh STA Address<< are adhered next to the third field 404, namely a first destination address field 406 captioned >>Destination Mesh STA Address #1<<, a field 408 in the drawing captioned >> . . . << and denoting a wildcard for a number N-2 of further destination address fields and, finally, an N-th destination address field 410 captioned >>Destination Mesh STA Address #N<<.

In analogy to the congestion notification element known from FIG. 2 the congestion notification element further contains four Congestion Notification Expiration Timer fields 412, 414, 416, 418. The Congestion Notification Expiration Timers are the same for all listed mesh destinations. If different Congestion Notification Expiration Timers are required for some mesh destinations, multiple Congestion Notification elements have to be used. A value of one in the third field 404 for the Number of Destinations field leads to an identical information of the Congestion Notification element shown in FIG. 2.

Figure 5:
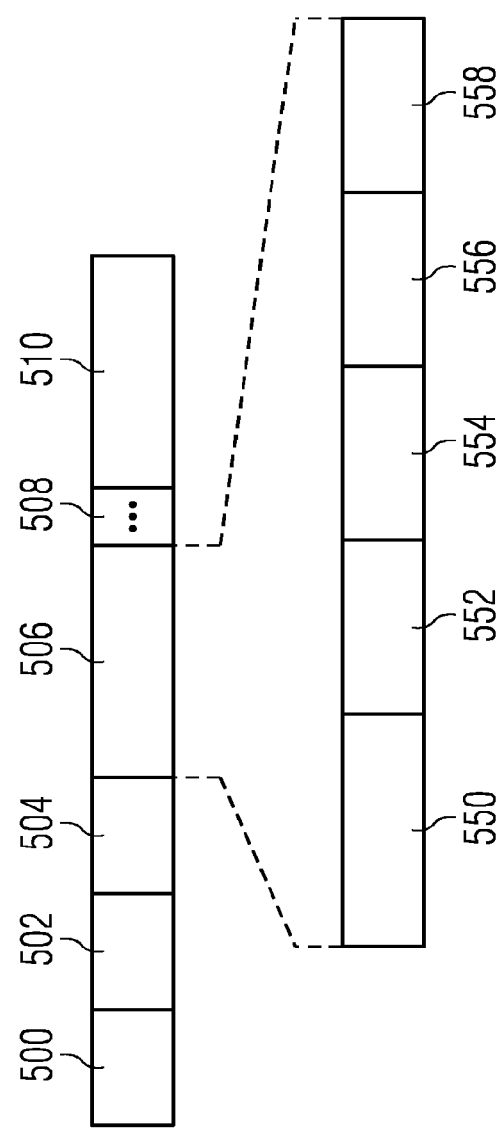
FIG. 5 shows an exemplary structure of a congestion notification element with multiple congestion notifications according to an example embodiment.

FIG. 5 shows an exemplary structure of a further amended congestion notification element according to a further embodiment. By using said notification element the usage of different Congestion Notification Expiration Timers per affected mesh destination is supported.

In analogy to the congestion notification element known from FIG. 2, the congestion notification element according to FIG. 5 includes a first field 500 captioned >>Element ID<< and having a length of one octet and a second field 502 captioned >>Length<< and having a length of one octet.

A third field 504 captioned >>Number of Congestion Notifications N<< defines a number (N) of Congestion Notifications 506,508,510 contained in this Congestion Notification element. The third field 504 has a length of one octet.

Said Congestion Notifications 506,508,510 are adhered next to the third field 504, namely a first Congestion Notification 506 captioned >>Congestion Notification #1<<, a field 508 in the drawing captioned >> . . . << and denoting a wildcard for a number N-2 of further Congestion Notifications 508 and, finally, an N-th Congestion Notification 510 captioned >> Congestion Notification #N<<.

Each Congestion Notification 506,508,510 is defined by a number of sub-fields. Said sub-fields 550,552,554,556,558 of the first Congestion Notification 506 are shown in the drawing below the illustration of the congestion notification element.

A first sub-field 550 is captioned >>Destination Mesh STA Address #1<< and has a length of six octets.

In analogy to the congestion notification element known from FIG. 2 the Congestion Notification further contains four Congestion Notification Expiration Timer sub-fields 552, 554, 556, 558.

Hence, a Congestion Notification consists of the address of the mesh destination for which congestion control has to be applied and the four Congestion Notification Expiration Timers. This allows different Congestion Notification Expiration Timers per affected mesh destination. A value of 1 for the Number of Congestion Notifications field 504 leads to an identical information of the Congestion Notification element shown in FIG. 2.

According to one embodiment, a representation of multiple congestion notifications is to transmit multiple Congestion Notification elements according to or similar to FIG. 2 in a single Congestion Control Notification frame. This is the simplest representation of congestion notifications due to the small size of the Congestion Notification element and its easy processing.

In the following, an application example is described. A wireless mesh network including some data flows as shown in FIG. 3 is considered. There are three data flows:
data flow DF3 from mesh node A to mesh node F;
data flow DF4 from mesh node A to mesh node G; and;
data flow DF5 form mesh node A to mesh node E.

The link from mesh node C to mesh node D is the bottleneck BN on the paths for data flows DF3, DF4.

Mesh node C becomes congested since more data frames for destination mesh nodes F,G arrive at mesh node C than mesh node C can actually forward to the next hop, mesh node D.

Data flows DF3, DF4 as the cause of the congestion can be derived by inspecting the respective data frames, wherein the transmitter address is set to mesh node B and the mesh destination address is set to mesh node F or mesh node G, respectively and from the forwarding information of the paths, i.e. precursor mesh node for destination mesh nodes F, G.

Mesh node C constructs two Congestion Notification elements according to an embodiment as shown in FIG. 6 and FIG. 7. The structure of said Congestion Notification elements in FIG. 6 and FIG. 7 corresponds to the structure according to FIG. 2.

The congestion notification element according to FIG. 6 includes a first field 600 captioned >>Element ID<<. It contains a value that indicates a Congestion Notification element. A second field 602 is captioned >>Length<<. The second field 602 carries a decimal value of 14. A third field 604 specifying the destination mesh node address carries the MAC address of the mesh node F.

The congestion notification element contains four Congestion Notification Expiration Timer fields 606, 608, 610, 612, namely a first Congestion Notification Expiration Timer field 606 captioned >>Congestion Notification Expiration Timer AC_BK<<, a second Congestion Notification Expiration Timer field 608 captioned >>Congestion Notification Expiration Timer AC_BE, a third Congestion Notification Expiration Timer field 610 captioned >>Congestion Notification Expiration Timer AC_VI<< and a fourth Congestion Notification Expiration Timer field 612 captioned >>Congestion Notification Expiration Timer AC_VO<<.

The first Congestion Notification Expiration Timer field 606 carries an exemplary value of t0, the second Congestion Notification Expiration Timer field 608 carries an exemplary value of t1, the third Congestion Notification Expiration Timer field 610 carries an exemplary value of t2 and the fourth Congestion Notification Expiration Timer field 612 carries an exemplary value of t3. However, the actual values of the four Congestion Notification Expiration Timers are not necessary for the explanation hereinafter.

The congestion notification element according to FIG. 7 includes a first field 700 captioned >>Element ID<<. It contains a value that indicates a Congestion Notification element. A second field 702 is captioned >>Length<<. The second field 702 carries a decimal value of 14. A third field 704 specifying the destination mesh node address carries the MAC address of the mesh node G.

The congestion notification element contains four Congestion Notification Expiration Timer fields 706, 708, 710, 712, namely a first Congestion Notification Expiration Timer field 706 captioned >>Congestion Notification Expiration Timer AC_BK<<, a second Congestion Notification Expiration Timer field 708 captioned >>Congestion Notification Expiration Timer AC_BE, a third Congestion Notification Expiration Timer field 710 captioned >>Congestion Notification Expiration Timer AC_VI<< and a fourth Congestion Notification Expiration Timer field 712 captioned >>Congestion Notification Expiration Timer AC_VO<<.

The first Congestion Notification Expiration Timer field 706 carries an exemplary value of t4, the second Congestion Notification Expiration Timer field 708 carries an exemplary value of t5, the third Congestion Notification Expiration Timer field 710 carries an exemplary value of t6 and the fourth Congestion Notification Expiration Timer field 712 carries an exemplary value of t7. However, the actual values of the four Congestion Notification Expiration Timers are not necessary for the explanation hereinafter.

The Congestion Notification elements according to FIGS. 6 and 7 are transmitted in a single Congestion Control Notification frame to the precursor on the paths of data flows DF3, DF4, which is mesh node B.

After mesh node B has received the Congestion Control Notification frame with the two Congestion Notification elements according to FIG. 6 and FIG. 7, said mesh node B stores the relevant information of each congestion notification, including:
the mesh node, or next hop, to which mesh node B should postpone the forwarding of data frames. This is the transmitter of the Congestion Control Notification frame. Its address is contained in the transmitter address field of the header of the Congestion Control Notification frame.

the mesh destination for which mesh node B should postpone the forwarding of data frames if the next hop corresponds to the sender of the congestion notification. This address is contained in the Destination Mesh STA Address field of the Congestion Notification element.

the four congestion notification expiration timers, for each access category.

In the example, the stored values of Congestion Notifications at mesh node B would be stored according to a Table 1 as shown below:

| next hop | mesh destination | congestion notification expiration timer AC_BK | congestion notification expiration timer AC_BE | congestion notification expiration timer AC_VI | congestion notification expiration timer AC_VO |
|---|---|---|---|---|---|
| mesh node C | mesh node F | t0 | t1 | t2 | t3 |
| mesh node C | mesh node G | t4 | t5 | t6 | t7 |

A >>mesh STA<< (>>mesh station<<) is a frequently used expression for a mesh node as used herein.

Mesh node B now receives a data frame of data flow DF3, that is, a data frame with mesh node F as mesh destination. Mesh node B checks the conditions for postponing the forwarding of the data frame:

The first IF-condition is true, because the MAC address of the next hop of the data frame (according to the forwarding information for mesh node F, this is mesh node C) corresponds to the MAC address of the transmitter of a Congestion Notification element. Note that Table 1 shown above includes two entries for mesh node C.

The second IF-condition is true, because the mesh destination MAC address of the data frame, which is mesh node F, corresponds to a mesh destination entry of Table 1 shown above for mesh node C as next hop.

Since both nested IF-conditions are true, the forwarding of the data frame for mesh destination F is postponed.

Mesh node B now receives a data frame of data flow DF4, that is, a data frame with mesh node G as mesh destination. Mesh node B checks the conditions for postponing the forwarding of the data frame:

The first IF-condition is true, because the MAC address of the next hop of the data frame (according to the forwarding information for mesh node G, this is mesh node C) corresponds to the MAC address of the transmitter of a Congestion Notification element. Note that Table 1 shown above includes two entries for mesh node C.

The second IF-condition is true, because the mesh destination MAC address of the data frame, which is mesh node G, corresponds to a mesh destination entry of Table 1 shown above for mesh node C as next hop.

Since both nested IF-conditions are true, the forwarding of the data frame for mesh destination G is postponed.

Mesh node B now receives a data frame of data flow DF5, that is, a data frame with mesh node E as mesh destination. Mesh node B checks the conditions for postponing the forwarding of the data frame:

The first IF-condition is false, because there is no entry for the MAC address of the next hop of the data frame (according to the forwarding information for mesh node G, this is mesh node E) in column "next hop" of the stored congestion notifications.

Since already the first IF-condition is false, the forwarding of the data frame for mesh destination E is not postponed. The data frame is, therefore, forwarded.

Assume, that mesh node B becomes congested as well, because it does not forward data frames for destinations F and G that it receives. In the same way as mesh node C, it will construct two Congestion Notification elements which are sent by a single Congestion Control Notification frame to mesh node A.

The content of the Destination Mesh node Address fields is the same, only the times for the Congestion Notification Expiration Timer fields might be different. Table 2 below shows the stored values for the received congestion notifications at mesh node A.

In the example, the stored values of Congestion Notifications at mesh node A would be stored according to Table 2 as shown below:

| next hop | mesh destination | congestion notification expiration timer AC_BK | congestion notification expiration timer AC_BE | congestion notification expiration timer AC_VI | congestion notification expiration timer AC_VO |
|---|---|---|---|---|---|
| mesh node B | mesh node F | ... | ... | ... | ... |
| mesh node B | mesh node G | ... | ... | ... | ... |

Mesh node A now wants to forward a data frame of data flow DF3, that is, a data frame with mesh node F as mesh destination. Mesh node A checks the conditions for postponing the forwarding of the data frame:

The first IF-condition is true, because the MAC address of the next hop of the data frame (according to the forwarding information for mesh node F, this is mesh node B) corresponds to the MAC address of the transmitter of a Congestion Notification element. Note that Table 2 shown above includes two entries for mesh node B.

The second IF-condition is true, because the mesh destination MAC address of the data frame (which is mesh node F) corresponds to a mesh destination entry of Table 2 for mesh node B as next hop.

Since both nested IF-conditions are true, the forwarding of the data frame for the destination mesh node F is postponed.

Mesh node A now wants to forward a data frame of data flow DF4, that is, a data frame with mesh node G as mesh destination. Mesh node A checks the conditions for postponing the forwarding of the data frame:

The first IF-condition is true, because the MAC address of the next hop of the data frame (according to the forwarding information for mesh node G, this is mesh node B) corresponds to the MAC address of the transmitter of a Congestion Notification element. Note that Table 2 shown above includes two entries for mesh node B.

The second IF-condition is true, because the mesh destination MAC address of the data frame (which is mesh node G) corresponds to a mesh destination entry of Table 2 for mesh node B as next hop.

Since both nested IF-conditions are true, the forwarding of the data frame for destination mesh node G is postponed.

Mesh node A now wants to forward a data frame of data flow DF5, that is, a data frame with mesh node E as mesh destination. Mesh node A checks the conditions for postponing the forwarding of the data frame:

The first IF-condition is true, because the MAC address of the next hop of the data frame (according to the forwarding information for mesh node E, this is mesh node B) corresponds to the MAC address of the transmitter of a Congestion Notification element. Note that Table 2 shown above includes two entries for mesh node B.

The second IF-condition is false, because there is no entry for the mesh destination MAC address of the data frame (which is mesh node E) in column >>mesh destination<< of Table 2 with mesh node B as next hop.

Since not both of the nested IF-conditions are true, the forwarding of the data frame for mesh destination E is not postponed. The data frame is forwarded. This correct and advantageous behavior at mesh node A is possible with the disclosed embodiments.

What is claimed is:

1. A method of controlling congestion in a mesh network, whereby the congestion is affecting at least one dataflow-destined mesh destination and non-affecting a further mesh destination, the method comprising the steps of:
receiving at least one congestion control notification frame by a receiving mesh node, the at least one congestion control notification frame being sent by a transmitting mesh node, the at least one congestion control notification frame including at least one congestion notification element;
reading at least one transmitter mesh node address of said at least one congestion control notification frame as next hop address;
reading at least one destination mesh node address of said at least one congestion notification element including each at least one field specifying the affected, dataflow-destined mesh destination, which indicates that an intra-mesh congestion control is to be applied only to at least one data frame destined to the affected, dataflow-destined mesh destination and not applied to at least one data frame destined to the non-affected mesh destination, said destination mesh node address being an individual address or a broadcast address; and
reading at least one congestion notification expiration timer of said at least one congestion notification element.

2. The method according to claim 1, comprising the steps of:
receiving a data frame by said receiving mesh node, the data frame including a destination address of said data frame;
reading the destination address of said data frame; and
reading a next hop address for the destination address of said data frame from a forwarding information.

3. A method of controlling congestion in a mesh network, the method comprising the steps of:
receiving at least one congestion control notification frame by a receiving mesh node, the at least one congestion control notification frame being sent by a transmitting mesh node, the at least one congestion control notification frame including at least one congestion notification element;
reading at least one transmitter mesh node address of said at least one congestion control notification frame as next hop address;
reading at least one destination mesh node address of said at least one congestion notification element, said destination mesh node address being an individual address or a broadcast address;
reading at least one congestion notification expiration timer of said at least one congestion notification element;
postponing a forwarding of said data frame by said receiving node for the case that said next hop address for said data frame is equal to at least one next hop address from said at least one congestion control notification frame; and
said destination address of said data frame is equal to at least one destination mesh node address from said at least one next hop address of said at least one congestion notification element.

4. The method according to claim 3, whereby said postponing of said forwarding of said data frame is done until a corresponding congestion notification expiration timer of a corresponding access category has expired.

5. The method according to claim 1, further comprising the steps of:
postponing a forwarding of said data frame by said receiving node for the case that said next hop address for said data frame is equal to at least one next hop address from said at least one congestion control notification frame; and
at least one destination mesh node address from said at least one next hop address of said at least one congestion notification element is equal to said broadcast address.

6. The method according to claim 5, whereby said postponing of said forwarding of said data frame is done until a corresponding congestion notification expiration timer of a corresponding access category has expired.

7. A method for indicating a congestion status of a mesh node in a mesh network, whereby the congestion status being indicated is affecting at least one dataflow-destined mesh destination and non-affecting a further mesh destination, the method comprising:
at least one of transmitting and receiving a congestion notification element including at least one field specifying the affected, dataflow-destined-H mesh destination, which indicates that an intra-mesh congestion control is to be applied to at least one data frame destined to the affected, dataflow-destined mesh destination and not applied to at least one data frame destined to the non-affected mesh destination.

8. The method according to claim 7, wherein the dataflow-destined mesh destination is determined by an address of a destination mesh node.

9. The method according to claim 7, wherein the dataflow-destined mesh destination is determined by a broadcast address.

10. The method according to claim 7, wherein the congestion notification element includes a field specifying a number of fields each field of the number of fields is specifying a respective dataflow-destined mesh destination.

11. The method according to one of claim 7, wherein the congestion notification element comprises at least one congestion notification, wherein each congestion notification comprises one of the at least one field specifying the dataflow-destined mesh destination, wherein each congestion notification further comprises at least one field specifying a congestion notification expiration timer, wherein the congestion notification element further comprises a field specifying a number of congestion notifications included in the congestion notification element.

12. The method according to claim 7, wherein at least one of transmitting and receiving a congestion control notification frame including at least one of the congestion notification element.

13. The method according to claim 12, wherein the congestion control notification frame includes fields according to known standard specification IEEE P802.11s of the Institute of Electrical and Electronics Engineers.

14. A non-transitory computer-readable medium for controlling congestion in a mesh network, whereby the congestion is affecting at least one dataflow-destined mesh destination and non-affecting a further mesh destination, the medium making a processor of a mesh node within the mesh network execute the steps of:
receiving at least one congestion control notification frame by a receiving mesh node, the at least one congestion control notification frame being sent by a transmitting mesh node, the at least one congestion control notification frame including at least one congestion notification element;
reading at least one transmitter mesh node address of said at least one congestion control notification frame as next hop address;
reading at least one destination mesh node address of said at least one congestion notification element including each at least one field specifying the affected, dataflow-destined mesh destination, which indicates that an intra-mesh congestion control is to be applied only to at least one data frame destined to the affected, dataflow-destined mesh destination, said dataflow-destined destination mesh node address being an individual address or a broadcast address; and;
reading at least one congestion notification expiration timer of said at least one congestion notification element.

15. The non-transitory computer-readable medium according to claim 14, the program making the processor further executes the steps of:
receiving a data frame by said receiving mesh node, the data frame including a destination address of said data frame;
reading the destination address of said data frame; and;
reading a next hop address for the destination address of said data frame from a forwarding information.

16. A non-transitory computer-readable medium for controlling congestion in a mesh network, the medium making a processor of a mesh node within the mesh network execute the steps of:
receiving at least one congestion control notification frame by a receiving mesh node, the at least one congestion control notification frame being sent by a transmitting mesh node, the at least one congestion control notification frame including at least one congestion notification element;
reading at least one transmitter mesh node address of said at least one congestion control notification frame as next hop address;
reading at least one destination mesh node address of said at least one congestion notification element, said destination mesh node address being an individual address or a broadcast address;
reading at least one congestion notification expiration timer of said at least one congestion notification element; the program making the processor execute the step of postponing a forwarding of said data frame by said receiving node for the case that said next hop address for said data frame is equal to at least one next hop address from said at least one congestion control notification frame; and
said destination address of said data frame is equal to at least one destination mesh node address from said at least one next hop address of said at least one congestion notification element.

17. The non-transitory computer-readable medium according to claim 16, whereby said postponing of said forwarding of said data frame is done until a corresponding congestion notification expiration timer of a corresponding access category has expired.

18. The non-transitory computer-readable medium according to claim 14, the program making the processor execute the step of postponing a forwarding of said data frame by said receiving node for the case that said next hop address for said data frame is equal to at least one next hop address from said at least one congestion control notification frame; and
at least one dataflow-destined destination mesh node address from said at least one next hop address of said at least one congestion notification element is equal to said broadcast address.

19. The non-transitory computer-readable medium according to claim 18, whereby said postponing of said forwarding of said data frame is done until a corresponding congestion notification expiration timer of a corresponding access category has expired.

20. A non-transitory computer-readable medium for indicating a congestion status of a mesh node in a mesh network, whereby the congestion status being indicated is affecting at least one dataflow-destined mesh destination and non-affecting a further mesh destination, the medium making a processor of the mesh node within the mesh network execute: a congestion notification element including at least one field specifying a dataflow-destined mesh destination, which indicates that an intra-mesh congestion control is to be applied only to at least one data frame destined to the affected, dataflow-destined mesh destination and not applied to at least one data frame destined to the non-affected mesh destination.

21. The non-transitory computer-readable medium according to claim 20, wherein the mesh destination being determined by an address of a destination mesh node.

22. The non-transitory computer-readable medium according to claim 20, wherein the dataflow-destined mesh destination is determined by a broadcast address.

23. The non-transitory computer-readable medium according to claim 20, wherein the congestion notification element comprises a field specifying a number of fields each field of the number of fields specifying a respective dataflow-destined mesh destination.

24. The non-transitory computer-readable medium according to claim 20, wherein the congestion notification element including at least one congestion notification, wherein each congestion notification comprises one of the at least one field specifying the dataflow-destined mesh destination, wherein each congestion notification further including at least one field specifying a congestion notification expiration timer, wherein the congestion notification element further comprises a field specifying a number of congestion notifications included in the congestion notification element.

25. The non-transitory computer-readable medium according to claim 20, wherein a congestion control notification frame comprises at least one of the congestion notification elements.

26. The non-transitory computer-readable medium according to claim 24, wherein the congestion control notification frame comprises fields according to known standard specifications IEEE P802.11s of the Institute of Electrical and Electronics Engineers.

* * * * *